June 25, 1929.  F. T. COLDWELL  1,718,529
TESTING APPARATUS
Filed May 1, 1928   2 Sheets-Sheet 1
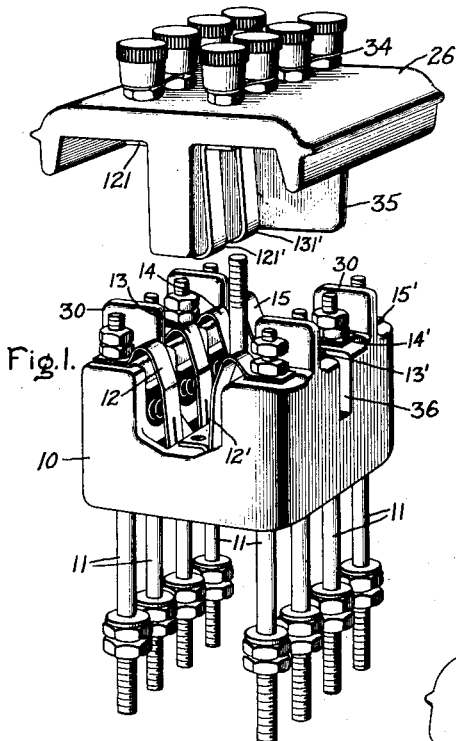
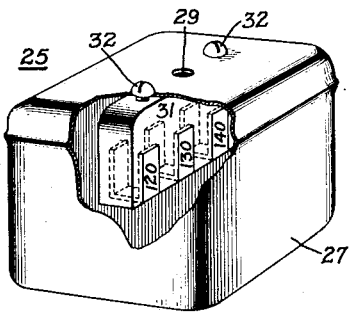
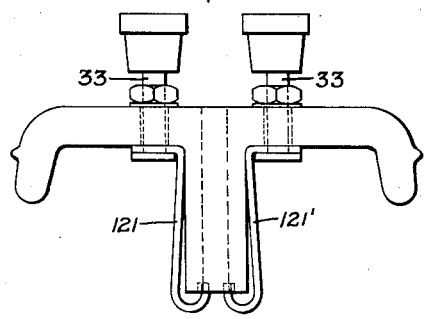
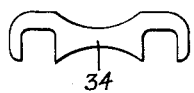
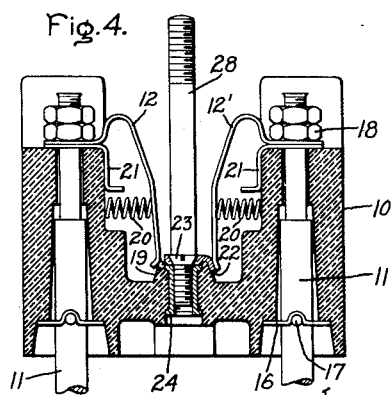
Inventor:
Frank T. Coldwell,
by Charles E. Tullar
His Attorney June 25, 1929.  F. T. COLDWELL  1,718,529
TESTING APPARATUS
Filed May 1, 1928   2 Sheets-Sheet 2

Inventor:
Frank T. Coldwell,
by Charles E. Tullar
His Attorney

Patented June 25, 1929.

1,718,529

UNITED STATES PATENT OFFICE.

FRANK T. COLDWELL, OF ALPLAUS, NEW YORK, ASSIGNOR TO GENERAL ELECTRIC COMPANY, A CORPORATION OF NEW YORK.

TESTING APPARATUS.

Application filed May 1, 1928. Serial No. 274,289.

My invention relates to improvements in testing apparatus and more particularly to improvements in devices for testing electric relays, meters and the like.

It is essential to the safe and proper operation of electric power and distribution systems that the condition of meters and relays, particularly as to their operativeness and accuracy, be known. To this end inspection, which may include testing and also calibrating, is necessary at intervals whose frequency is dictated by experience. Obviously, it is of prime importance that such testing and calibrating operations be conducted under maximum conditions of safety to the human element and also the apparatus. Moreover, the work must be accomplished as quickly and, therefore, as simply as possible in order that protective apparatus may be out of commission the shortest possible time. In this connection, it is preferable that only the minimum amount of protective gear be out of commission at any instant so as to maintain protection in so far as possible. Furthermore, it is often desirable to test meters and relays separately so as not to subject the meters to the high values of current used in relay testing and so as not to have the relays out of service while the meters are being tested. It is, of course, obvious that in the process of testing protective gear, a false operation causing an unnecessary opening of the circuit is undesirable since continuity of service may thereby be interrupted. It is also desirable to have the testing apparatus readily available particularly for standard tests and yet so flexible as to be readily adaptable to whatever test may be necessary with the minimum of equipment and wiring changes and particularly so that the latter can be performed substantially without hazard.

An object of my invention is to provide improved testing apparatus which economically complies with the foregoing conditions. Another object of my inventon is to provide improved testing apparatus which may readily be installed on the front of switchboards and the like as a part of the permanent switchboard equipment. Other objects of my invention will appear hereinafter.

My invention will be better understood from the following description when considered in connection with the accompanying drawings and its scope will be pointed out in the appended claims.

Figure 7:
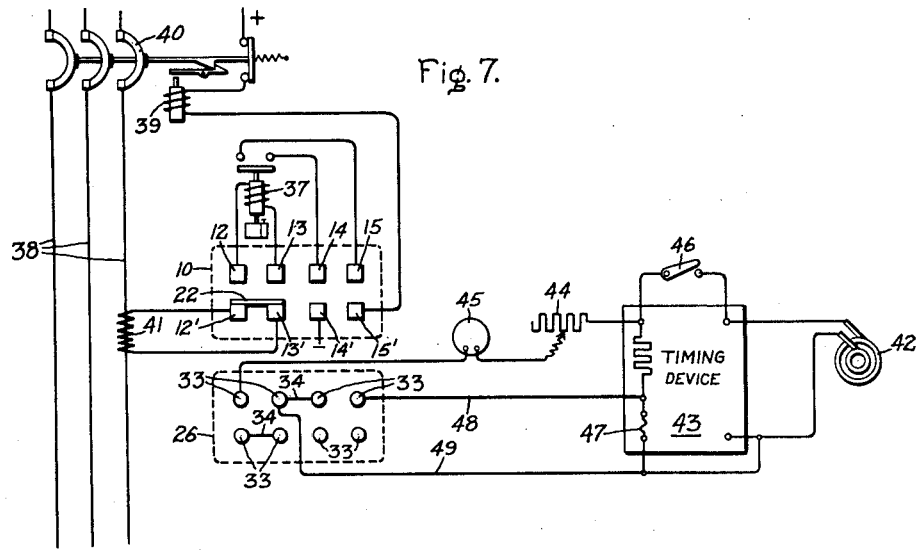
Figure 8:
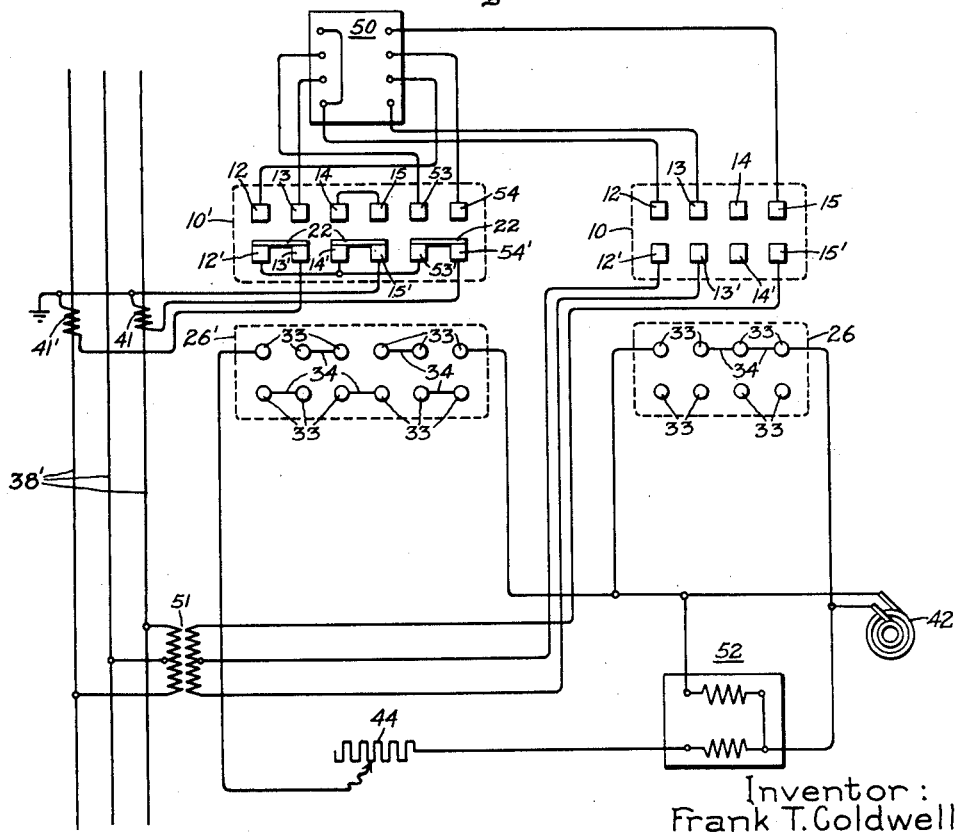

In the accompanying drawings, Figs. 1, 2 and 3 illustrate in perspective parts of testing apparatus embodying my invention; Fig. 4 is a transverse section of a part of the testing apparatus shown in Fig. 1; Fig. 5 is an end view of a part of the testing apparatus shown in Fig. 3; Fig. 6 is a plan view of a connecting link for use with that part of the testing apparatus shown in Fig. 3; Fig. 7 illustrates diagrammatically relay testing apparatus embodying my invention and Fig. 8 illustrates diagrammatically meter testing apparatus embodying my invention.

In accordance with my invention, I provide, as shown in Fig. 1, a stationary or base member such as a block 10 of insulating material. This block is adapted to be mounted permanently on the front side of a switchboard by any suitable means such as studs 11 and may be of any suitable moulded insulating material. Mounted on the block are a plurality of pairs of spaced opposed contacts 12, 12'; 13, 13'; 14, 14'; and 15, 15'. These contacts are housed in the central hollow portion of the block 10 and may be secured thereto by the studs 11 as more clearly shown in Fig. 4. The studs 11 project through holes in the block and, as shown, are provided with a shoulder in the form of a crimped washer 16 which is keyed to the stud by a pin 17 and which seats in a recess in the block which is provided with a groove to receive the crimped portion of the washer. This construction prevents turning of the stud when the nut 18 is tightened to secure the associated contact to the block.

The contacts such as 12, 12' of each pair are biased for a limited movement toward each other but insufficient to permit them to engage each other, engagement being prevented by the intervening ridge or barrier 19. For this bias, the contacts may of themselves be of resilient material and springs 20 may also be provided. In order to prevent the springs from creeping upward out of place, retaining members 21 may be provided. With this construction, it will be obvious that each stud provides at each end a terminal for its associated contact so that connections may be made either from the front or the back of the switchboard to any contact. Where desired there may be provided, for reasons which will hereinafter appear, means adapted to be mounted on the barrier 19 of the block 10, such as a conducting member or piece 22 for connecting or bridging two or more adjacent or laterally disposed contacts of different pairs when the contacts are free to move under their bias. This conducting piece 22 may be secured to the block 10 by countersunk screws 23 which engage suitably tapped ferrules 24 inserted in holes in the block. The lower head of the ferrule 24 is square and seats in a square recess in the block so as to prevent turning of the ferrule and the upper end of the ferrule is expanded or spun over to maintain it in place.

Further in accordance with my invention, I provide interchangeable cover members 25 and 26, such as shown in Figs. 2 and 3 respectively, for controlling circuits through the contacts 12, 12′, etc. as may be desired. The cover member 25 shown in Fig. 2 is the normal cover and includes a shell or housing 27, which may be of metal, for enclosing the block 10 and the parts thereof on the front side of the switchboard. The cover 25 may be secured to the block in any suitable manner such as by a bolt 28 which projects through the block 10 from the back and registers with a hole 29 in the shell 27, suitable means such for example as a wing-nut (not shown), being turned onto the end of the bolt after the shell is in place. In order to prevent any possibility of the metallic portion 27 of the cover 25 touching the outer ends of the contact studs 11, the depth of the cover is preferably such that the shell 27 seats on the face of the switchboard with sufficient clearance between the inner side of the top of the shell and the ends of these contact studs. The block 10 may also be provided with bridge walls 30 of such a height as to prevent the shell from coming down far enough to touch the ends of the studs 11.

In order to complete circuits through the contacts of the respective pairs thereof when the cover 25 is in position, it is provided with an inside projecting member or wall 31 which is of insulating material and which may be secured to the shell 27 by suitable means such as screws 32. The wall 31 is provided with a plurality of spaced conducting members 120, 130, 140, etc. which may be U-shaped as shown and moulded into the insulating material of the wall. When the cover 25 is applied to the block 10, these contact members 120, etc., separate the contacts 12, 12′, etc. of the respective pairs and may thereby complete circuits therethrough. The separation of the contacts of each pair is such that, where the conducting strip 22 is employed, the movement of the contacts is sufficient to disengage the contacts from this strip. The depth of the contact carrying wall 31, however, is such that none of the U-shaped contact members 120, 130, etc. can engage the contact strip 22 when the cover 25 is applied to the base.

The interchangeable cover member 26 shown in Fig. 3 is adapted to be substituted for the cover member 25 and provides in accordance with my invention means for effecting a predetermined change in the connections through the pairs of contacts 12, 12′, etc. of the base or block 10. The cover member or plug 26 may be of moulded insulating material and is provided with a plurality of pairs of opposed separated contacts 121, 121′; 131, 131′, etc. respectively arranged to engage the corresponding contacts 12, 12′; 13, 13′; etc. of the block 10 when the plug is applied thereto. Each of these contacts has associated therewith terminals 33 which serve to secure the contacts to the plug and which project through the plug on the side thereof opposite the contacts 121, 121′; etc., whereby testing devices may be connected thereto. In order to facilitate easy connections with one simple form of connecting link, these terminals are preferably arranged in equi-distantly spaced rows and columns so that a simple connecting link 34 such as shown in Fig. 6 may be employed to bridge either two adjacent or two opposed terminals.

To prevent improperly applying the plug 26 to the block 10 and thereby effecting connections other than the predetermined ones desired, the plug and block are preferably provided with interlocking means which will insure a definite positioning of the one relatively to the other. For this purpose the plug may be provided with a projecting member or wall 35 which is arranged to register with a corresponding recess 36 in the block 10.

In the testing arrangement shown in Fig. 7, there is illustrated an application of a four-pole block 10 and plug 26 which although schematically shown are constructed in accordance with the embodiment of my invention heretofore described. This particular arrangement is illustrated as employed in the testing of protective relays such as an overcurrent relay 37 responsive to conditions in the circuit 38 to control the circuit of the trip coil 39 of a circuit breaker 40. While the circuit 38 is shown as polyphase, only one relay is shown as the others may be similarly arranged. For each protective relay there may be provided adjacent thereto on the switchboard a testing block 10, the contacts 12, 13 of which are connected to the terminals of the relay winding 37. To the opposed contacts 12′, 13′ are connected the terminals of the secondary of the current transformer 41 which is to energize the relay 37. Leads from each of the contacts of the relay 37 go to the block contacts 14, 15. The contact 14′ is connected to one side of the tripping source and the contact 15′ to the other side through the trip coil 39 and an auxiliary switch on the circuit breaker 40. When the cover 25 (not shown in Fig. 7) is in position over the block 10, it will be obvious from what has already been described that the contacts 12, 12′ will be connected by the contact 120 on the cover and the contacts 13, 13′ by the contact 130 on the cover. Moreover, both of the contacts 12′, 13′ will be moved away from the conducting strip 22 so that the current transformer secondary will not be short-circuited. Consequently, the relay 37 is directly connected to the current transformer secondary so as to be responsive to current conditions in the circuit 38.

For testing the relay any suitable apparatus may be employed and I have indicated such as including an alternating current source 42, a timing device 43, examples of which are well known to the art, a current controlling device such as a resistance 44 and an ammeter 45, all of which are arranged for cooperation in the testing of the relay through the medium of the plug 26 and the block 10 upon the removal of the cover 25. Before applying the plug 26 to the block 10 connections are made as follows: a connecting link 34 is applied between the plug terminals 33 corresponding to the contacts 12′, 13′ of the block 10. Consequently, when the plug is applied to the block 10, the current transformer secondary remains short-circuited. The plug terminals 33 corresponding to the contacts 12, 13 of the block are connected to the testing source through the ammeter 45 and the variable resistance 44. A connecting link 34 is applied between the plug terminals 33 corresponding to the contacts 13 and 14. The plug terminal 33 corresponding to the contact 15 of the block 10 is connected to the starting control coil of the timing device 43.

With everything thus prepared for the test it remains but to substitute for the cover 25 the plug 26. The testing circuit may then be closed by the starting switch 46 which sets the timer in operation, the control means 44 being set for whatever desired current it is required to test. The time of operation of the relay for this current will be registered by the timing device since when the relay 37 closes its contacts it short-circuits the starting element 47 of the timing device through the block contacts 14, 15, the plug terminals 33 corresponding thereto, the link 34 associated with one of these terminals and conductors 48 and 49. In this manner the relay may be tested for its time-current characteristic and calibrated as desired. It is to be noted that when the plug 26 is in position for testing that the trip coil circuit is open at the plug terminals 33 corresponding to the contacts 14′, 15′ so that no false operation of the circuit breaker can occur to interrupt continuity of service on the circuit 38. When the work has been done, it remains but to pull the plug 26 and replace the cover 25 when all circuits will be restored to their original condition without the necessity of making any wiring changes, either in the relay circuits or the circuits of the testing apparatus. The advantages of this are obvious since on any board there may be many relays to be tested and the procedure is exactly the same for any given type of relays and in any event it is merely necessary to have a testing plug properly connected to the testing apparatus and then apply this to the test block associated with each relay by merely substituting the plug for the normal test block cover. Moreover, since the whole operation is on the safe side of the switchboard, that is the front, the hazard to the operator is minimized. Inasmuch as the block may comprise any number of poles, four being shown in Fig. 7, it is obvious that the testing circuits may be arranged in a great many ways so that there is considerable leeway and flexibility possible for the necessary relay tests.

In testing arrangement shown in Fig. 8 there is illustrated an application of a four-pole block 10 and its plug 26, and a six-pole block 10′ and its plug 26′, both of which, although schematically shown, are constructed in accordance with the embodiment of my invention shown in Figs. 1, 2 and 3. This particular arrangement is illustrated as employed in the testing of a meter such as a poly-phase watthour meter 50, associated with a poly-phase circuit 38′. For each watthour meter there may be provided on the switchboard one four-pole block 10 and one six-pole block 10′ as shown. The leads from the potential transformer 51 are connected to the contacts 12′, 13′, 15′, of the four-pole block 10 and, of course, when the normal cover 25 of this block is applied thereto the circuits through the pairs of contacts 12, 12′; 13, 13′; 15, 15′ will be completed through the corresponding cover contacts 120, 130, etc. The plug 26 which is substituted for the cover of this four-pole block when it is desired to test has the terminal 33 corresponding to the plug contact 12 connected to one side of the testing source 42 and the three terminals 33 corresponding to contacts 13, 14 and 15 interconnected by links 34 and connected to the other side of the testing source 42. The testing equipment may further include a rotating standard 52, examples of which are well known to the art, and current control means such as the resistance 44. The current energized means of the standard 52 and the control means 44 are connected to those plug terminals 33 of the six-pole test plug 26' which correspond to the block contacts 12 and 54. The terminals 33 corresponding to the contacts 13 and 14 and likewise the terminals 33 corresponding to contacts 15 and 53 are interconnected by links 34. Inasmuch as the six-pole block and plug are used in this case as the current testing device in connection with the current transformers 41, 41', the pairs of adjacent contacts 12', 13'; 14', 15' and 53', 54', are provided with conducting pieces 22 so that each pair becomes short-circuited upon removal of the cover, not shown in Fig. 8. Likewise, the pairs of plug terminals 33 corresponding to the contacts 12', 13'; 14', 15'; 16', 17' are provided with connecting links 34 so that when the cover is replaced by the plug 26', the current transformer secondaries will remain short-circuited. To test the watthour meter it is then merely necessary after preparing the test plugs 26, 26', as shown, to remove the block covers and substitute therefor the plugs, the particular connection shown being suitable for the usual type of two coil watthour meter. Upon completion of the test it remains but to pull the plugs and replace the covers and the original circuits are restored without any wiring changes or delay.

Where meters and relays have their current coils supplied from the same current transformer, it is obvious that the provision of a separate test block for both the relays and the meter will permit of the testing of either while the other is in service so that it is unnecessary to have protection impaired while the meters are being tested or to submit the meters and their delicate mechanism to the greater currents which are usually employed in the testing and calibrating of relay devices. Although I have shown testing arrangements embodying my invention as applied to a particular type of relay and meter it will be apparent to those skilled in the art that because of the flexibility of the testing apparatus it is readily adaptable to the tests, either ordinary or special which have to be made in connection with various types of protective relays, meters, instruments, etc.

What I claim as new and desire to secure by Letters Patent of the United States is:

1. A device for testing electric relays, meters and the like, including a block adapted to be secured to a switchboard, a plurality of pairs of spaced opposed contacts mounted on said block, the contacts of each pair being biased for a limited movement toward each other, terminals associated with said contacts and extending through said block, and interchangeable members for controlling circuits through said contacts including a cover for enclosing said block and contacts, a wall inside of the cover provided with spaced conducting members arranged respectively to spread the contacts of the respective pairs thereof to complete a circuit therethrough when the cover is applied to the block, and means for effecting a predetermined change in the connections through said contacts including a plug adapted to be substituted for said cover, a wall on one side of said plug provided with a plurality of pairs of opposed separated contacts respectively arranged to engage the contacts of the block, and terminals respectively associated with the plug contacts and projecting through the plug on the side thereof opposite the contacts.

2. A device for testing electric relays, meters and the like, including a block adapted to be secured to a switchboard, a plurality of pairs of spaced opposed contacts mounted on said block, the contacts of each pair being biased for a limited movement toward each other, terminals associated with said contacts and extending through said block and interchangeable members for controlling circuits through said contacts including a cover for enclosing said block and contacts, a wall inside of the cover provided with spaced conducting members arranged respectively to spread the contacts of the respective pairs thereof to complete a circuit therethrough when the cover is applied to the block, and means for effecting a predetermined change in the connections through said contacts including a plug adapted to be substituted for said cover, a wall on one side of said plug provided with a plurality of pairs of opposed separated contacts respectively arranged to engage the contacts of the block, terminals respectively associated with the plug contacts and projecting through the plug on the side thereof opposite the contacts, and interlocking means for insuring the placing of said plug in said block in a predetermined position relatively to the plug.

3. A device for testing electric relays, meters and the like, including a block adapted to be secured to a switchboard, a plurality of pairs of spaced opposed contacts mounted on said block, the contacts of each pair being biased for a limited movement toward each other, terminals associated with said contacts and extending through said block, and interchangeable members for controlling circuits through said contacts including a cover for enclosing said block and contacts, a wall inside of the cover provided with spaced conducting members arranged respectively to spread the contacts of the respective pairs thereof to complete a circuit therethrough when the cover is applied to the block, and means adapted to be mounted on the base of the block for bridging two adjacent contacts of the pairs thereof of said block upon removal of the cover, and means for effecting a predetermined change in the connections through said contacts including a plug adapted to be substituted for said cover, a wall on one side of said plug provided with a plurality of pairs of opposed separated contacts respectively arranged to engage the contacts of the block, and terminals respectively associated with the plug contacts and projecting through the plug on the side thereof opposite the contacts.

4. A device for testing electric relays, meters and the like including a stationary member provided with a plurality of pairs of spaced opposed contacts, terminals associated with said contacts and extending through said stationary member and interchangeable members for controlling circuits through said contacts including a cover for enclosing the stationary member and its contacts, spaced conducting members inside of the cover arranged respectively to engage the contacts of the respective pairs thereof to complete a circuit therethrough when the cover is applied to the stationary member and means for effecting a predetermined change in the connections through said contacts including a plug adapted to be substituted for said cover, a plurality of pairs of opposed spaced contacts on one side of said plug respectively arranged to engage the contacts of the stationary member and terminals respectively associated with the plug contacts and projecting through the plug on the side thereof opposite the contacts.

5. Testing apparatus including in combination a current transformer and a device to be tested, a stationary member provided with two pairs of spaced opposed contacts the contacts of each pair being biased for a limited movement toward each other and two adjacent contacts of said pairs being connected to the device to be tested and the other two adjacent contacts to the terminals of the current transformer, a conducting piece mounted in said stationary member and arranged to be engaged only by the contacts connected to the current transformer when free to move under their bias, and interchangeable members for controlling the circuits through said contacts including a cover provided with two spaced contacts arranged respectively to bridge the contacts of said pairs thereof of the stationary member whereby when the cover is applied to the stationary member the device to be tested is connected in series with the current transformer and whereby when the cover is removed the current transformer is short-circuited, and a plug provided with two pairs of spaced opposed contact members respectively arranged to engage the contacts on the stationary member when applied thereto, and terminals respectively associated with the plug contacts and projecting through the plug on the side thereof opposite the contacts whereby a testing source may be connected to one pair of said terminals to supply current to the device to be tested and whereby means may be provided to interconnect the other pair of terminals before the plug is applied so as to maintain the current transformer short-circuited while the plug is in position.

In witness whereof I have hereunto set my hand this 30th day of April, 1928.

FRANK T. COLDWELL.